US007996141B2

(12) United States Patent
Pache et al.

(10) Patent No.: US 7,996,141 B2
(45) Date of Patent: Aug. 9, 2011

(54) METHOD FOR OPERATING AN INTERNAL COMBUSTION ENGINE

(75) Inventors: Jens Pache, Kaufungen (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 405 days.

(21) Appl. No.: 12/235,967

(22) Filed: Sep. 23, 2008

(65) Prior Publication Data

US 2009/0088949 A1 Apr. 2, 2009

(30) Foreign Application Priority Data

Sep. 28, 2007 (DE) ........................ 10 2007 046 489

(51) Int. Cl.
*B60T 7/12* (2006.01)
*F02B 25/06* (2006.01)

(52) U.S. Cl. ...................................... 701/103; 123/572

(58) Field of Classification Search .................. 701/103, 701/104, 101; 123/704, 572, 573, 574, 520, 123/689

See application file for complete search history.

(56) References Cited

U.S. PATENT DOCUMENTS

| | | | | |
|---|---|---|---|---|
| 5,178,121 A * | 1/1993 | Kitajima et al. | .............. | 123/689 |
| 5,746,187 A | 5/1998 | Ninomiya et al. | ............ | 123/520 |
| 5,988,150 A | 11/1999 | Osanai | .......................... | 123/698 |
| 6,453,887 B1 | 9/2002 | Hayashi et al. | ............... | 123/520 |
| 7,469,685 B2 | 12/2008 | Osanai | .......................... | 123/520 |
| 7,610,906 B2 | 11/2009 | Takakura et al. | ............. | 123/520 |
| 2001/0029933 A1 | 10/2001 | Fabre | ............................ | 123/520 |

FOREIGN PATENT DOCUMENTS

DE 35 02 573 A1 7/1986

* cited by examiner

*Primary Examiner* — Mahmoud Gimie

(74) *Attorney, Agent, or Firm* — King & Spalding L.L.P.

(57) ABSTRACT

In a method for operating an internal combustion engine with a crankcase breather venting into an intake tract, operating parameters of the internal combustion engine are measured 102. A mass flow of fuel from the crankcase into the intake tract is determined as a function of the operating parameters measured 103. The internal combustion engine is controlled 111 or monitored 108 as a function of the mass flow of fuel from the crankcase into the intake tract.

17 Claims, 2 Drawing Sheets

METHOD FOR OPERATING AN INTERNAL COMBUSTION ENGINE

CROSS-REFERENCE TO RELATED APPLICATIONS

This application claims priority to German Patent Application No. 10 2007 046 489.6 filed Sep. 28, 2007, the contents of which is incorporated herein by reference in its entirety.

TECHNICAL FIELD

The present invention relates to a method for operating an internal combustion engine with a crankcase breather venting into an intake tract of the internal combustion engine. The present invention also relates to a program with instructions for controlling such a method and to a device for controlling and/or monitoring the operability of an internal combustion engine.

BACKGROUND

In particular immediately after cold starting of an internal combustion engine, unburnt fuel may be dissolved in a lubricant of the internal combustion engine, then evaporate again as the operating temperature increases. With reciprocating piston gasoline or diesel engines, for example, particularly in the first seconds after cold starting, fuel may condense on the oil film on the cold wall of the combustion chamber and dissolve in the oil film. This problem arises mainly when fuel is injected directly into the combustion chamber and particularly with gasoline engines, but also with other fuel delivery methods and internal combustion engines.

The dissolving of fuel in the lubricant causes an undesirable change in the lubricating properties of the lubricant, thereby possibly increasing wear and the probability of the occurrence of a malfunction, and reducing the life expectancy of the internal combustion engine.

The fuel dissolved in the lubricant evaporates again as the operating temperature increases and collects in a reciprocating piston engine mainly in the crankcase. In order to prevent emission of unburned fuel into the environment, the crankcase is connected to the intake tract via a crankcase breather. Because of a pressure drop from the crankcase to the intake tract, there arises a mass flow from the crankcase into the intake tract which is dependent on the operating state of the internal combustion engine. Said mass flow (known as blow-by) consists of exhaust gas and air which are fed from the combustion chamber past the piston rings into the crankcase and possibly fuel which is evaporated out of the lubricant in the crankcase.

The control system of a modern internal combustion engine monitors the operability of its components by performing diagnostics on the available operating parameters. Fuel evaporated out of the lubricant and entering the intake tract via the crankcase breather riches the fuel-air mixture in the combustion chamber or chambers of the internal combustion engine. For complete combustion of the fuel and of the atmospheric oxygen ($\lambda=1$), the internal combustion engine's control system must meter in less fuel relative to the fresh air supplied to the internal combustion engine. Such an anomaly is interpreted by the control system as an engine malfunction, e.g. on the fuel supply device or on a lambda sensor. In order to avoid this misinterpretation, conventionally an excessively low amount of fuel to be metered into the internal combustion engine within a predetermined time interval after a cold start is not interpreted as a fault. This significantly limits engine malfunction diagnostics. This limitation is particularly severe if the engine is always operated only for a short time, e.g. in city traffic.

SUMMARY

An improved method for operating an internal combustion engine with a crankcase breather venting into an intake tract, and a program with instructions for controlling such a method and a device for controlling and/or monitoring the operability of an internal combustion engine can be created.

According to an embodiment, a method for operating an internal combustion engine with venting via a breather of a crankcase into an intake tract, may comprise the following steps: measuring operating parameters of the internal combustion engine; determining a mass flow of fuel from the crankcase into the intake tract as a function of the operating parameters measured; and controlling or monitoring the internal combustion engine as a function of the mass flow of fuel from the crankcase into the intake tract.

According to a further embodiment, the method may further comprise the following steps: defining a permissible range of a fuel-air ratio between the fuel supplied to the internal combustion engine and the fresh air supplied to the internal combustion engine as a function of the mass flow of fuel determined; determining the fuel-air ratio; and ascertaining operability or malfunction of the internal combustion engine depending on whether the fuel-air ratio determined is within the permissible range. According to a further embodiment, the method may further comprise the following steps: checking the plausibility of the mass flow of fuel determined; and ascertaining the operability of the internal combustion engine as a function of the plausibility of the mass flow of fuel determined. According to a further embodiment, the plausibility of the mass flow of fuel determined can be checked on the basis of the change over time of the mass flow of fuel determined. According to a further embodiment, the method may further comprise the following step: setting a precontrol parameter of the internal combustion engine as a function of the mass flow of fuel determined. According to a further embodiment, the method may further comprise the following steps: at starting, increasing a model parameter representing the mass of fuel dissolved in the lubricant of the internal combustion engine; and reducing the model parameter during operation of the internal combustion engine. According to a further embodiment, the model parameter can be increased at starting by an amount which depends on the temperature of the internal combustion engine measured at least one time instant. According to a further embodiment, the model parameter can be increased at starting by an amount which depends on the change over time of a temperature of the internal combustion engine. According to a further embodiment, the model parameter can be increased at starting by an amount which depends on a mass of fuel injected within a predetermined time interval or until a predetermined operating temperature of the internal combustion engine is attained. According to a further embodiment, the method may further comprise the following steps: setting a model parameter representing the mass of the fuel dissolved in a lubricant of the internal combustion engine to a predetermined initial value at starting; and reducing the model parameter during operation of the internal combustion engine. According to a further embodiment, the predetermined initial value can be a function of a temperature of the internal combustion engine at starting. According to a further embodiment, during operation of the internal combustion engine the model parameter can be reduced at a plurality of time instants by an amount dependent on the operating parameters measured at the respective time instant. According to a further embodiment, during operation of the internal combustion engine the model parameter can be reduced at a plurality of time instants by an amount dependent on the mass flow of fuel that was determined as a function of the operating parameters measured at the respective time instant. According to a further embodiment, a distinction can be drawn between first time instants at which the internal combustion engine is in a predetermined operating state, and second time instants at which the internal combustion engine is not in the predetermined operating state, at a first time instant, the reduction amount can be determined as a function of the operating parameters measured at the respective first time instant, at a second time instant, the reduction amount can be determined as a function of an operating parameter of the internal combustion engine and of a fuel concentration in the crankcase breather, the fuel concentration being determined as a function of operating parameters measured at the most recent time instant. According to a further embodiment, the method may further comprise the following steps: determining an end of a discharge of fuel from a lubricant of the internal combustion engine; and ascertaining operability or malfunction of the internal combustion engine after the end of discharge. According to a further embodiment, the method may further comprise the following steps: determining an end of discharge of fuel from a lubricant of the internal combustion engine; after the end of discharge determined, reducing a permissible range of a ratio of fuel supplied to the internal combustion engine to fresh air supplied to the internal combustion engine, and wherein the operability of the internal combustion engine is monitored by comparing the ratio of the fuel supplied to the internal combustion engine to the fresh air supplied to the internal combustion engine with the permissible range.

According to another embodiment, a computer readable program product storing instructions, which when executed on a processor perform such a method. According to yet another embodiment, a device for controlling and/or monitoring the operability of an internal combustion engine, may use such a program product. According to yet another embodiment, in a device for controlling and/or monitoring the operability of an internal combustion engine, the device is designed to carry out such a method.

BRIEF DESCRIPTION OF THE DRAWINGS

Exemplary embodiments of the present invention will now be explained in greater detail with reference to the accompanying drawings in which.

DETAILED DESCRIPTION

Figure 1:
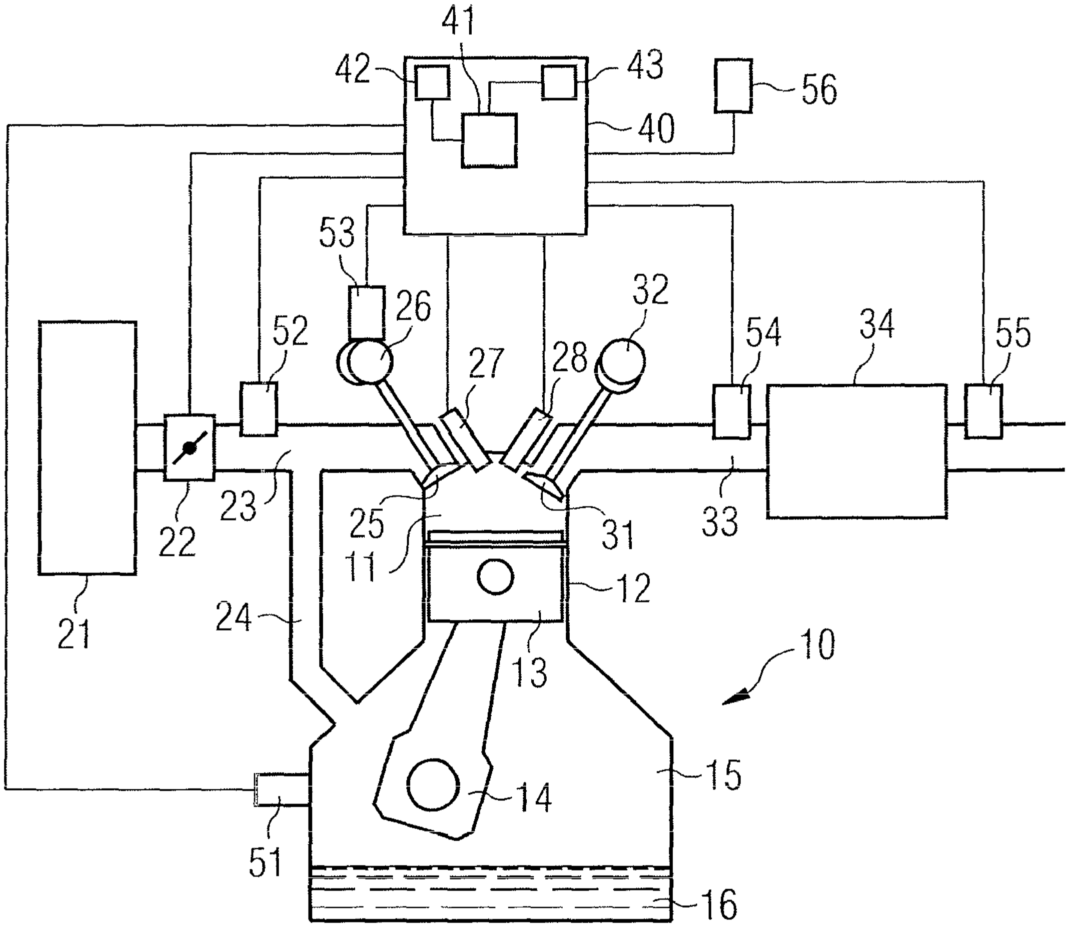
FIG. 1 schematically illustrates an internal combustion engine.

The various embodiments are based on the idea of determining a mass flow of fuel from a crankcase into an intake tract of an internal combustion engine as a function of operating parameters of the internal combustion engine and to take it into account for controlling or monitoring the internal combustion engine. One advantage is that, by taking the mass flow of fuel into account, more precise control and more complete and accurate monitoring of the operability of the internal combustion engine is possible.

To determine the mass flow of fuel, e.g. operating parameters of the internal combustion engine are compared at the time instant in question and at a time instant when no fuel evaporates from the lubricant. No or little fuel evaporates out, for example, at a low operating temperature shortly after a cold start. For example, at these two instants, the ratio of the mass flow of fresh air into the internal combustion engine to the mass flow of fuel metered into the internal combustion engine from a fuel supply device is considered in each case. Simultaneous deviations of the lambda factor from 1 or from another predefined lambda factor can be taken into account accordingly. This is equivalent to comparing the levels or values present at an output of a lambda control loop or comparing the additive adaptation values used for closed-loop lambda control at the two instants specified. An advantage of this determining of the mass flow of fuel is that it only requires parameters which are regularly detected by a control system of the internal combustion engine or are already present therein.

A mass flow of fuel determined in the manner described above can be checked for plausibility, e.g. on the basis of its changes over time, prior to its being used for controlling or monitoring the internal combustion engine. For example, it can be assumed that the ratio of the mass flow of fuel from the crankcase into the intake tract to the total mass flow from the crankcase into the intake tract varies only slowly and is a function of the temperature of the internal combustion engine. Such a plausibility check enables operating states indicating an engine malfunction to be differentiated from operating states in which fuel is merely being evaporated out of the lubricant and riching the fuel-air ratio in the combustion chamber or chambers of the internal combustion engine.

To further improve the control and/or monitoring of an internal combustion engine, the mass m(t) of the fuel dissolved in the lubricant of the internal combustion engine can be represented by a model parameter, said model parameter being, for example, the mass m(t) in grams or any other unit or being proportional to the mass m(t) using any proportionality factor.

The model parameter is for example set to a predetermined initial value for cold starting of the internal combustion engine or increased by an amount for each starting operation. This amount can be a function of the temperature obtaining at the starting instant of the internal combustion engine in order to model the temperature dependence of the condensation and dissolving of fuel in the lubricant film on the combustion chamber wall. After starting, the model parameter is reduced at regular or irregular intervals by an amount which is a function of the mass flow of fuel from the crankcase into the intake tract of the internal combustion engine and/or depends directly or indirectly on other operating parameters measured.

By taking the mass flow of fuel from the crankcase into the intake tract of an internal combustion engine into account in the manner described, an end of discharging or rather outgassing of fuel from a lubricant can be determined with greater accuracy. After the determined end of outgassing of fuel from the lubricant, control parameters can be changed, monitoring of engine operability initiated or the permissible range of a ratio of fuel supplied to the internal combustion engine to fresh air supplied to the internal combustion engine which is used for monitoring operability can be reduced.

FIG. 1 shows a schematic illustration of an internal combustion engine 10 having a combustion chamber 11 in a cylinder 12. The combustion chamber 11 is sealed off on one side (in FIG. 1 on its underside) by a piston 13. The piston 13 is connected via a connecting rod 14 to a crankshaft (not shown in FIG. 1) in a crankcase 15. The internal combustion engine 10, in particular the piston 13 moving in the cylinder 12, is lubricated by a lubricant 16 which accumulates in the crankcase 15 and is circulated and filtered by devices not shown in FIG. 1.

The internal combustion engine 10 also has an air filter 21, a throttle valve 22, an intake tract 23 and a breather 24 leading from the crankcase 15 into the intake tract 23. The intake tract 23 is connected to the combustion chamber 11 via an intake valve 25 which is controlled by means of a camshaft 26. Also disposed on the combustion chamber 11 of the internal combustion engine 10 are a fuel injection valve 27 and a spark plug 28. The fuel injection valve 27 can alternatively be disposed on the intake tract 23, i.e. upstream of the intake valve 25, or can be replaced by a carburetor or another fuel supply device. In the case of a diesel engine, the spark plug 28 can be omitted.

The combustion chamber 11 of the internal combustion engine 10 is also connected to an exhaust tract 33 via an exhaust valve 31 which is controlled by means of a camshaft 32. One or more catalytic converters 34 or other devices for filtering or conditioning exhaust gases of the internal combustion engine 10 can be disposed in the exhaust tract 33.

The internal combustion engine 10 is linked to a controller 40 which may be regarded as an integral part of the internal combustion engine 10. The controller 40 comprises a processor 41 which is linked to a program memory 42 and a value memory 43. The processor 41, the program memory 42 and the value memory 43 can each comprise one or more microelectronic components. Alternatively, the processor 41, the program memory 42 and the value memory 43 can be partly or completely incorporated in a microelectronic component. The program memory 42 can contain a program in the form of software or firmware for controlling one of the methods described below. Instead of the processor 41, the program memory 42 and the value memory 43, the controller 40 can have one or more discretely arranged or integrated analog or digital circuits which are designed to control one of the methods described below.

The controller 40 is connected via lines to a temperature sensor 51, a mass airflow sensor 52, an engine speed sensor 53, lambda sensors 54, 55, an ambient temperature sensor 56, the fuel injection valve 27, the spark plug 28, and optionally to other sensors or actuators and other devices of the internal combustion engine 10. The temperature sensor 51 is disposed on the internal combustion engine 10 such that it measures a relevant temperature, typically in the coolant circulation system, in the lubricant circulation system or on the cylinder head. The mass airflow sensor 52 detects the mass flow of fresh air from the air filter 21 via the throttle valve 22 into the intake tract 23. Alternatively, the mass airflow sensor 52 can be disposed upstream of the throttle valve 23 or even downstream of the point where the breather 24 enters the intake tract 23. In the latter case the equations given below would have to be modified accordingly.

Instead of the mass airflow sensor 52, a pressure sensor can be provided which measures the ambient pressure or the pressure in the intake tract 23. In this case, the mass flow of fresh air is calculated from the pressure and speed of the internal combustion engine (also from other operating parameters) or determined by means of an engine map or a look-up table. The speed sensor 53 measures the engine speed and is disposed for this purpose e.g. on a camshaft 26 or on a flywheel of the internal combustion engine 10. The lambda sensors 54, 55 are disposed e.g. upstream or downstream of the catalytic converter 34 in the exhaust tract 33. The ambient temperature sensor 56 is disposed, for example, such that it measures the temperature of the ambient atmosphere, unaffected by the heat produced by the internal combustion engine 10 or other devices. Alternatively, the ambient temperature sensor 56 or another temperature sensor can be disposed on the air sensor 21 or in the intake tract 23 such that it measures the temperature of the fresh intake air. Further sensors can be disposed on the internal combustion engine 10 in addition to or instead of the sensors 51, 52, 53, 54, 55, 56 shown in FIG. 1.

Figure 2:
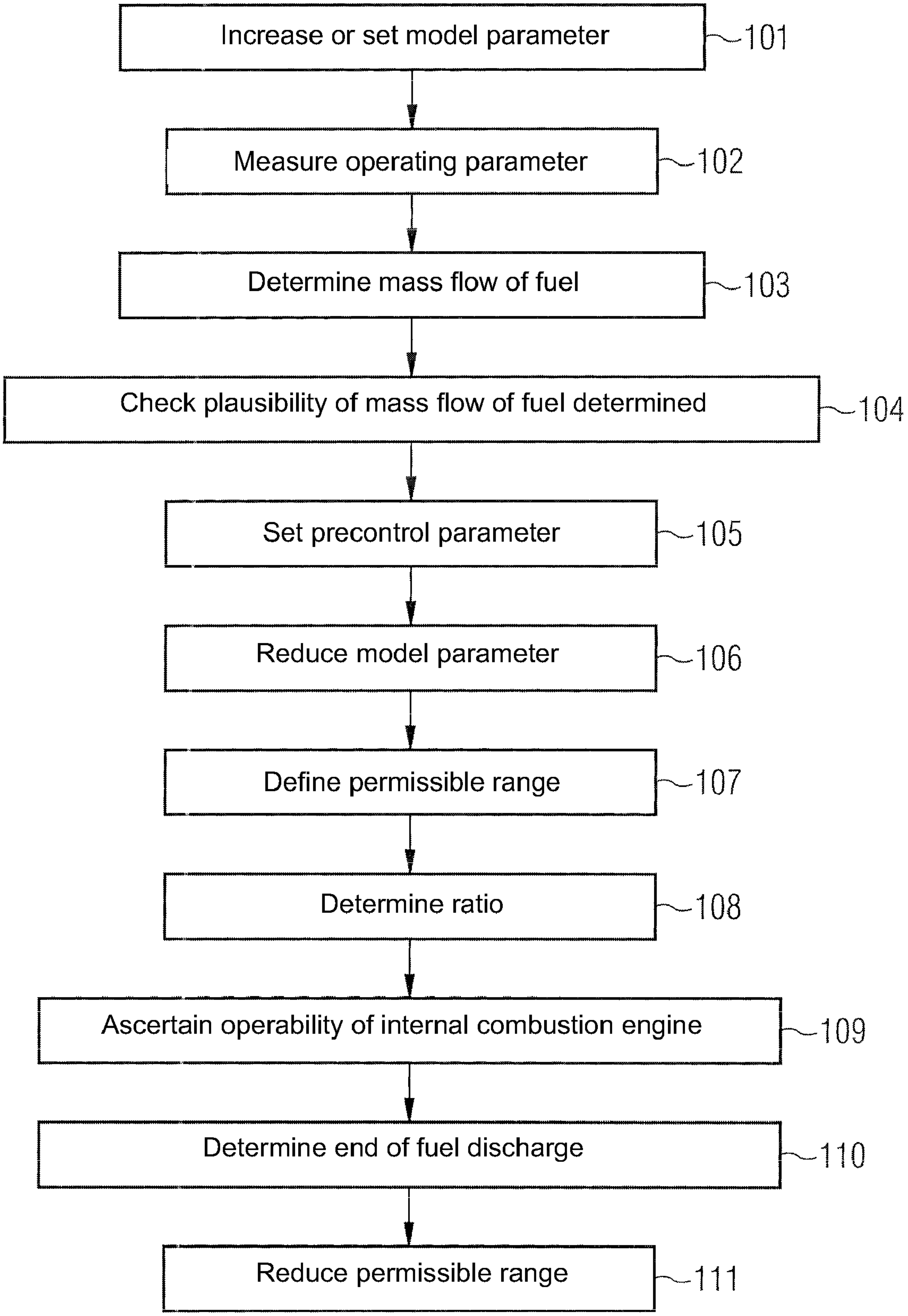
FIG. 2 is a schematic flowchart of a method for operating an internal combustion engine.

The internal combustion engine shown in FIG. 1 or also another internal combustion engine can be operated using one of the methods described below with reference to FIG. 2. These methods can be controlled, for example, by the controller 40. The mathematical models and equations now presented below will be used for different variants of the methods.

For complete combustion of a predetermined mass flow of fuel $\dot{m}_{Fuel}$, i.e. for complete reaction of the fuel with atmospheric oxygen, the mass airflow $\dot{m}_{Air,stoichiometric}=\dot{m}_{Fuel}\cdot k$ is required, k being a stoichiometric factor dependent on the composition of the fuel. Let mass airflow $\dot{m}_{Air}$ actually be available. The ratio of $\dot{m}_{Air}$, the mass flow of air actually available, to $\dot{m}_{Air,stoichiometric}$, the mass flow of air required for complete combustion, is termed the lambda factor or stoichiometric ratio λ, $$\lambda = \frac{\dot{m}_{Air}}{\dot{m}_{Air,stoichiometric}} = \frac{\dot{m}_{Air}}{\dot{m}_{Fuel}\cdot k}. \quad \text{(Equation 1)}$$

In the case of a piston engine with venting of the crankcase into the intake tract via a breather, the mass flow of air $\dot{m}_{Air}$ into the combustion chamber or chambers contains at least two contributions, $\dot{m}_{Air}=\dot{m}_{Air,Intake}+\dot{m}_{Air,BlowBy}$. The larger contribution $\dot{m}_{Air,Intake}$ is ambient i.e. fresh air which is sucked in e.g. via an air filter. A smaller contribution $\dot{m}_{Air,BlowBy}$ comes from the crankcase of the internal combustion engine and is fed into the intake tract of the internal combustion engine.

The mass flow of fuel $\dot{m}_{Fuel}$ also comprises at least two contributions, $\dot{m}_{Fuel}=\dot{m}_{Fuel,Injection}+\dot{m}_{Fuel,BlowBy}$. The larger part $\dot{m}_{Fuel,Injection}$ is introduced by a fuel injection device or another fuel supply device into the intake tract or directly into the combustion chamber or chambers. A smaller contribution $\dot{m}_{Fuel,BlowBy}$ comes from the crankcase of the internal combustion engine. Particularly at low operating temperatures, fuel condenses on the wall or walls of the combustion chamber(s) where it dissolves in the oil. Particularly at higher or high operating temperatures, the fuel dissolved in the oil evaporates again and passes directly into the combustion chamber or chambers or into the intake tract of the internal combustion engine via the crankcase and crankcase breather.

The complete lambda factor is therefore $$\lambda = \frac{\dot{m}_{Air}}{\dot{m}_{Fuel}\cdot k} = \frac{\dot{m}_{Air,Intake} + \dot{m}_{Air,BlowBy}}{(\dot{m}_{Fuel,Injection} + \dot{m}_{Fuel,BlowBy})\cdot k_S}. \quad \text{(Equation 2)}$$

However, Equation 2 does not take account of the fact that the fuel evaporating out of the oil has a different temperature- and time-dependent composition from that of the fuel freshly supplied from the fuel supply. This different composition of the fuel evaporating out of the oil can be taken into account using a corrected, e.g. temperature- and time-dependent, stoichiometric factor $k'(T,t)_S$, $$\lambda = \frac{\dot{m}_{Air,Intake} + \dot{m}_{Air,BlowBy}}{\dot{m}_{Fuel,Injection} \cdot k_S + \dot{m}_{Fuel,BlowBy} \cdot k'_S(T,t)}. \quad \text{(Equation 3)}$$

Disregarding any fuel entering the oil and any fuel discharged from the oil ($\dot{m}_{Fuel,BlowBy}=0$), the lambda factor is $$\lambda_0 = \frac{\dot{m}_{Air,Intake} + \dot{m}_{Air,BlowBy}}{\dot{m}_{Fuel,Injection} \cdot k_S}. \quad \text{(Equation 4)}$$

Equation 4 applies e.g. at low operating temperature, as the rate at which the fuel evaporates out of the lubricant is temperature-dependent. Equation 4 also applies after longer operation at normal operating temperature. At normal operating temperature, little or no fuel condenses on combustion chamber walls, and the fuel entering the oil is negligible. After longer operation, fuel previously dissolved in the lubricating oil will have (almost) completely evaporated again, and the fuel discharged from the lubricating oil is negligible.

The lambda factor $\lambda_0$ measured at a low operating temperature and consequently with minimal discharge of fuel from the lubricant, and the lambda factor $\lambda$ measured at higher temperature can be set in relation to one another. By dividing Equation 4 by Equation 2 we get $$\frac{\lambda_0}{\lambda} = \frac{\dot{m}_{Fuel,Injection} + \dot{m}_{Fuel,BlowBy}}{\dot{m}_{Fuel,Injection}} = 1 + \frac{\dot{m}_{Fuel,BlowBy}}{\dot{m}_{Fuel,Injection}}. \quad \text{(Equation 5)}$$

Equation 4 can be solved for $\dot{m}_{Fuel,BlowBy}$, $$\dot{m}_{Fuel,BlowBy} = \left(\frac{\lambda_0}{\lambda} - 1\right) \cdot \dot{m}_{Fuel,Injection}. \quad \text{(Equation 6)}$$

The lambda factor $\lambda$ is a measured value obtained by a lambda sensor. The mass flow of fresh air $\dot{m}_{Air,Intake}$ is a measured value obtained by a mass airflow sensor or is determined from the ambient pressure and engine speed or other operating parameters of the internal combustion engine. The mass flow of air $\dot{m}_{Air,BlowBy}$ from the crankcase is dependent on various operating parameters and can be calculated from same or determined by means of an engine map or a look-up table. The mass flow of fuel $\dot{m}_{Fuel,Injection}$ from the fuel supply is a manipulated variable of the fuel supply device or a setpoint value specified for the fuel supply device. The dependence of the stoichiometric factor $k_S$ on the composition of the fuel discharged from the oil is assumed to be constant to a good approximation. This enables the discharge (blow-by) of fuel $\dot{m}_{Fuel,BlowBy}$ to be calculated, $$\dot{m}_{Fuel,BlowBy} = \frac{\dot{m}_{Air,Intake} + \dot{m}_{Air,BlowBy}}{\lambda \cdot k_S} - \dot{m}_{Fuel,Injection}. \quad \text{(Equation 7)}$$

The concentration $c_{BlowBy}=\dot{m}_{Fuel,BlowBy}/\dot{m}_{BlowBy}$ of the fuel in the total mass flow $\dot{m}_{BlowBy}=\dot{m}_{Air,BlowBy}+\dot{m}_{Fuel,BlowBy}$ from the crankcase into the intake tract can be calculated according to $$c_{BlowBy} = \frac{\dot{m}_{Air,Intake} + \dot{m}_{Air,BlowBy}}{(\dot{m}_{Fuel,BlowBy} + \dot{m}_{Air,BlowBy}) \cdot \lambda_{SP} \cdot k_S} \cdot \left(\frac{\lambda_{SP}}{\lambda_{meas}} - [1 + \Delta_{LC}]\right). \quad \text{(Equation 8)}$$

where $\lambda_{SP}$ is the setpoint value specified for the closed-loop lambda controller, $\lambda_{meas}$ is the lambda factor actually measured and $\Delta_{LC}$ is the deviation of the manipulated variable of the lambda controller at a time with outgassing of fuel from the lubricant with respect to a time without outgassing of fuel from the lubricant.

The mass of the fuel dissolved in the oil at time instant t is $$m(t) = m(t_0) + \int_{t_0}^{t} \dot{m}(t')\,dt' \quad \text{(Equation 9)}$$

or for calculation only at discrete time instants $t_i$ $$m(t_{i+1}) = m(t_i) + \dot{m}(t_i) \cdot \Delta t. \quad \text{(Equation 10)}$$

The calculation can be repeated with a fixed period $\Delta t = t_{i+1} - t_i = \text{const}\ \forall i$ or with variable time intervals $\Delta t_i = t_{i+1} - t_i$.

The mass flow from the crankcase into the intake tract decreases with increasing engine speed, i.e. is at its highest at idle. Both the mass flow of fuel $\dot{m}_{Fuel,Injection}$ from the fuel supply device and the mass flow of fresh air $\dot{m}_{Air,Intake}$ are at their lowest at idle. Therefore, the mass flow of fuel $\dot{m}_{Fuel/BlowBy}$ from the crankcase can be determined most precisely at idle (Equation 7). Determination of the mass flow of fuel $\dot{m}_{Fuel,BlowBy}$ from the crankcase becomes more imprecise as the engine speed and load increase.

In a variant of the method described below, the mass flow of fuel $\dot{m}_{Fuel,BlowBy}$ from the crankcase is only determined in a predetermined operating state according to Equation 7, e.g. only at idle or at low load and low engine speed. At higher speeds, the mass flow of fuel $\dot{m}_{Fuel,BlowBy}$ from the crankcase is determined from the concentration $c_{BlowBy}=\dot{m}_{Fuel,BlowBy}/\dot{m}_{BlowBy}$ of the fuel in the total mass flow $\dot{m}_{BlowBy}$, it being assumed that the concentration $c_{BlowBy}$ varies only slowly over time.

In this approximation, a distinction is therefore drawn between first time instants at which the internal combustion engine is in a predetermined operating state, and second time instants at which the internal combustion engine is not in the predetermined operating state. At the first instants, the mass flow of fuel $\dot{m}_{Fuel,BlowBy}$ is determined from the operating parameters of the internal combustion engine, e.g. by means of Equation 7. At the second time instants, the mass flow of fuel $\dot{m}_{Fuel,BlowBy}$ is determined with $$\dot{m}_{Fuel,BlowBy} = c_{BlowBy} \cdot \dot{m}_{BlowBy}, \quad \text{(Equation 11)}$$

a value determined at the most recent first time instant being used as the concentration $c_{BlowBy}$ of the fuel in the total mass flow.

A method for an internal combustion engine e.g. as described above with reference to FIG. 1 will now be described with reference to FIG. 2. The mathematical models and equations presented above will be used for different variants of this method. In the description which follows, reference characters from FIG. 1 will be used merely to facilitate understanding of the method and its variants described with reference to FIG. 2.

At starting or initiated by starting of an internal combustion engine 10, a model parameter is set to a predetermined initial value in a first step 101. In the case of the controller 40 described with reference to FIG. 1, the model parameter is held, for example, in the value memory 43. The predetermined initial value can be dependent on a temperature of the internal combustion engine at starting. The temperature of the coolant, the temperature of the lubricant or the temperature of the cylinder head, for example, can be used as the relevant temperature of the internal combustion engine 10 for this purpose. The setting of the model parameter replicates or rather mathematically models the fact that the mass of fuel condensing on the cold lubricant film on the inner wall of the combustion chamber 11 and dissolving in the lubricant film is dependent on the temperature of the lubricant film.

Alternatively, each time the internal combustion engine 10 is started, the model parameter is increased by a fixed predetermined amount or by a predetermined amount dependent on the temperature of the internal combustion engine at starting. For this purpose, when the internal combustion engine 10 is turned off, the model parameter is also stored until the next start. This models the fact that fuel from previous starts may be dissolved in the lubricant of the internal combustion engine 10.

In a second step 102, one or more operating parameters of the internal combustion engine 10 are measured. In the case of the internal combustion engine 10 described above with reference to FIG. 1, the operating parameter or parameters are measured e.g. by one or more sensors 51, 52, 53, 54, 55, 56. The operating parameters which can be measured in the second step 102 include, in particular, the rpm of the internal combustion engine 10 measured by the speed sensor 53, the mass flow of fresh air $\dot{m}_{Air,Intake}$ measured by the mass airflow sensor 52, the mass flow of fuel $\dot{m}_{Fuel,Injection}$ metered in by a fuel injection device or another fuel supply device of the internal combustion engine 10, a temperature of the internal combustion engine 10 measured by a temperature sensor 51, an ambient temperature measured by an ambient temperature sensor 56, an ambient pressure measured by an ambient pressure sensor (not shown in FIG. 1) or by a pressure sensor in an intake tract 23 of the internal combustion engine 10 prior to starting, and lambda factors obtained by one or more lambda sensors 54, 55.

In a third step 103 a mass flow of fuel $\dot{m}_{Fuel,BlowBy}$ from a crankcase 15 into the intake tract 23 of the internal combustion engine 10 is determined as a function of the operating parameters measured in step 102. Equation 6 or Equation 7, for example, is used for this purpose, it being possible for the mass flow of air $\dot{m}_{Air,BlowBy}$ from the crankcase 15 via the breather 24 into the intake tract 23 to be obtained from the engine speed and other operating parameters of the internal combustion engine 10 by means of a mathematical model or an engine map or a look-up table.

In a fourth step 104, the determined mass flow of fuel $\dot{m}_{Fuel,BlowBy}$ from the crankcase 15 into the intake tract 23 is checked for plausibility. For example, outgassing of fuel from an engine oil of a gasoline engine is typically to be observed only from a temperature of 65° C. or 70° C., is temperature-dependent at higher temperatures, but varies only slowly if the engine speed and load are constant. Moreover, it can be assumed that the concentration $c_{BlowBy}=\dot{m}_{Fuel,BlowBy}/\dot{m}_{BlowBy}$ of the fuel evaporating out of the lubricant in the total mass flow $\dot{m}_{BlowBy}=\dot{m}_{Air,BlowBy}+\dot{m}_{Fuel,BlowBy}$ is only weakly dependent on the engine speed and load and varies only slowly as a function of time.

With the latter assumption of only a weak variation in the concentration of the fuel in the total mass flow, a distinction can be drawn, as described above, between first time instants at which the internal combustion machine is in a predetermined operating state, and second time instants at which the internal combustion engine is not in the predetermined operating state. As described above, the mass flow of fuel $\dot{m}_{Fuel,BlowBy}$ at the second time instants can be determined using Equation 11, it being possible to use a value determined for the most recent first time instant as the concentration $c_{BlowBy}$ of the fuel in the total mass flow. Alternatively, this value is extrapolated from the most recent first instant under the assumption that the concentration $c_{BlowBy}$ decreases slowly.

A controller 40 of an internal combustion engine 10 can control manipulated variables simultaneously in an open- and closed-loop manner. For this purpose the output of an open-loop controller or control logic system can be superimposed (additively or multiplicatively) on an output of a closed-loop controller or control logic system. The open-loop control portion is in this case termed the precontrol. The more accurately the mathematical model on which the open-loop controller is based models the behavior of the internal combustion engine 10, the smaller the closed-loop portion becomes. Parameters of the model on which the open-loop controller is based can be set in a fifth step 105 as a function of the mass flow of fuel determined in the third step 103 and possibly checked for plausibility in the fourth step 104.

In a sixth step 106, the model parameter is reduced by an amount which depends on the mass flow of fuel $\dot{m}_{Fuel/BlowBy}$ determined in the third step 103 and/or on operating parameters measured in the second step 102, thereby modeling i.e. replicating the reduction in the mass of fuel dissolved in the lubricant of the internal combustion engine due to evaporation or discharge and removal via the breather 24.

In a seventh step 107, a permissible range of a fuel ratio of a mass flow of fuel $\dot{m}_{Fuel,Injection}$ supplied to the internal combustion engine 10 by a fuel supply device to a mass flow of fresh air $\dot{m}_{Air,Intake}$ supplied to the internal combustion engine is defined as a function of the mass flow of fuel $\dot{m}_{Fuel,BlowBy}$ determined in step 103. Alternatively, the permissible range is ascertained as a function of other operating parameters of the internal combustion engine 10, e.g. as a function of a temperature of the internal combustion engine 10 and the model parameter set or increased in the first step 101 and reduced in the sixth step 106.

In an eighth step 108, the actual instantaneous fuel-air ratio is determined. In the case of the internal combustion engine described above with reference to FIG. 1, for this purpose the ratio is taken of the mass flow of fresh air $\dot{m}_{Air,Intake}$ measured by the mass airflow sensor 52 to the mass flow of fuel $\dot{m}_{Fuel,Injection}$ metered into the internal combustion engine 10 via the fuel injection valve 27.

In a ninth step 109, operability or malfunction of the internal combustion engine is ascertained by comparing the fuel-air ratio determined in the eighth step 108 with the permissible range determined in the seventh step 107. In particular, if the fuel-air ratio determined in the eighth step 108 deviates from the permissible range established in the seventh step 107, this indicates a malfunction of the fuel supply device, the mass airflow sensor 52 or a lambda probe 54, 55.

The second step 102, the third step 103, the fourth step 104, the fifth step 105, the sixth step 106, the seventh step 107, the eighth step 108 and the ninth step 109 are repeated periodically or at any points in time.

In a tenth step 110, an end of discharge of fuel from a lubricant is determined. The end of discharge or outgassing of fuel can be detected, for example, from the fact that the model parameter no longer exhibits positive values or that the mass flow of fuel $\dot{m}_{Fuel,BlowBy}$ from the crankcase 15 into the intake tract 23 determined in the third step 103 assumes the value 0 or is less than a predetermined threshold. It can also be provided that the end of discharge or outgassing of fuel from the lubricant of the internal combustion engine is determined in any case a predetermined time after the last starting of the internal combustion engine 10.

After the end of discharge of fuel determined or detected in the tenth step 110, the permissible range of the fuel-air ratio already defined in the seventh step 107 is reduced, in an eleventh step 111, to a predetermined value which can be dependent on operating parameters of the internal combustion engine 10. This means that more stringent requirements can be set for subsequent checking of the operability of the internal combustion engine.

For variants of the method described above with reference to FIG. 2, various steps are omitted. For example, the mathematical modeling of the mass m(t) of fuel dissolved in the lubricant by the model parameter in the first step 101 and in the sixth step 106 can be dispensed with. Alternatively, the plausibility checking in the fourth step 104 can be dispensed with.

The control system described above with reference to FIG. 1 and the method described above with reference to FIG. 2 and its variants can be used for all types of fuel and engine. The method has particular advantages e.g. for gasolines containing ethanol, as ethanol is particularly prone to condense on cold combustion chamber walls because of its high boiling point.

What is claimed is:

1. A method for operating an internal combustion engine with venting via a breather of a crankcase into an intake tract, comprising the following steps:

measuring one or more operating parameters of the internal combustion engine;

calculating a mass blow-by flow of fuel from the crankcase into the intake tract as a function of the one or more operating parameters measured;

defining a permissible range of a fuel-air ratio between the fuel supplied to the internal combustion engine and fresh air supplied to the internal combustion engine as a function of the calculated mass blow-by flow of fuel;

determining an actual fuel-air ratio in the internal combustion engine;

comparing (a) the determined actual fuel-air ratio with (b) the permissible range of a fuel-air ratio defined as a function of the calculated mass blow-by flow of fuel; and based at least on the comparison, controlling or ascertaining operability or malfunction of the internal combustion engine.

2. The method according to claim 1, further comprising the following steps:

checking the plausibility of the calculated mass blow-by flow of fuel; and ascertaining the operability of the internal combustion engine as a function of the plausibility of the calculated mass blow-by flow of fuel.

3. The method according to claim 2, wherein the plausibility of the calculated mass blow-by flow of fuel is checked on the basis of the change over time of the calculated mass blow-by flow of fuel.

4. The method according to claim 1, further comprising the following step:

setting a precontrol parameter of the internal combustion engine as a function of the calculated mass blow-by flow of fuel.

5. The method according to claim 1, further comprising the following steps:

at starting, increasing a model parameter representing the mass of fuel dissolved in the lubricant of the internal combustion engine; and reducing the model parameter during operation of the internal combustion engine.

6. The method according to claim 5, wherein the model parameter is increased at starting by an amount which depends on the temperature of the internal combustion engine measured at least one time instant.

7. The method according to claim 5, wherein the model parameter is increased at starting by an amount which depends on the change over time of a temperature of the internal combustion engine.

8. The method according to claim 5, wherein the model parameter is increased at starting by an amount which depends on a mass of fuel injected within a predetermined time interval or until a predetermined operating temperature of the internal combustion engine is attained.

9. The method according to claim 1, further comprising the following steps:

setting a model parameter representing the mass of the fuel dissolved in a lubricant of the internal combustion engine to a predetermined initial value at starting; and reducing the model parameter during operation of the internal combustion engine.

10. The method according to claim 9, wherein the predetermined initial value is a function of a temperature of the internal combustion engine at starting.

11. The method according to claim 5, wherein during operation of the internal combustion engine the model parameter is reduced at a plurality of time instants by an amount dependent on the operating parameters measured at the respective time instant.

12. The method according to claim 5, wherein during operation of the internal combustion engine the model parameter is reduced at a plurality of time instants by an amount dependent on the mass blow-by flow of fuel that was calculated as a function of the operating parameters measured at the respective time instant.

13. The method according to claim 11, wherein a distinction is drawn between first time instants at which the internal combustion engine is in a predetermined operating state, and second time instants at which the internal combustion engine is not in the predetermined operating state, at a first time instant, the reduction amount is determined as a function of the operating parameters measured at the respective first time instant, at a second time instant, the reduction amount is determined as a function of an operating parameter of the internal combustion engine and of a fuel concentration in the crankcase breather, the fuel concentration being determined as a function of operating parameters measured at the most recent time instant.

14. The method according to claim 1, further comprising the following steps:

determining an end of a discharge of fuel from a lubricant of the internal combustion engine; and ascertaining operability or malfunction of the internal combustion engine after the end of discharge.

15. The method according to claim 1, further comprising the following steps:

determining an end of discharge of fuel from a lubricant of the internal combustion engine;

after the end of discharge determined, reducing a permissible range of a ratio of fuel supplied to the internal combustion engine to fresh air supplied to the internal combustion engine, and wherein the operability of the internal combustion engine is monitored by comparing the ratio of the fuel supplied to the internal combustion engine to the fresh air supplied to the internal combustion engine with the permissible range.

16. A computer readable program product stored in non-transitory storage media and operable, when executed, to:

calculate a mass blow-by flow of fuel from the crankcase into the intake tract as a function of one or more measured operating parameters of the internal combustion engine;

define a permissible range of a fuel-air ratio between the fuel supplied to the internal combustion engine and fresh air supplied to the internal combustion engine as a function of the calculated mass blow-by flow of fuel;

compare (a) an actual fuel-air ratio in the internal combustion engine with (b) the permissible range of a fuel-air ratio defined as a function of the calculated mass blow-by flow of fuel; and control, or monitor operability of, the internal combustion engine based at least on the results of the comparison.

17. A device for controlling and/or monitoring the operability of an internal combustion engine, the device configured to execute a program product stored in non-transitory storage media to:

calculate a mass blow-by flow of fuel from the crankcase into the intake tract as a function of one or more measured operating parameters of the internal combustion engine;

define a permissible range of a fuel-air ratio between the fuel supplied to the internal combustion engine and fresh air supplied to the internal combustion engine as a function of the calculated mass blow-by flow of fuel;

compare (a) an actual fuel-air ratio in the internal combustion engine with (b) the permissible range of a fuel-air ratio defined as a function of the calculated mass blow-by flow of fuel; and control, or monitor operability of, the internal combustion engine based at least on the results of the comparison.

* * * * *